United States Patent Office 3,154,401
Patented Oct. 27, 1964

3,154,401
STABILIZED HERBICIDAL COMPOSITION AND
METHOD OF EMPLOYING THE SAME
Krijn van den Boogaart, Vlaardingen, Netherlands, assignor to Fabriek Van Chemische Producten Vondelingenplaat N.V., Rotterdam, Netherlands
No Drawing. Filed Dec. 28, 1961, Ser. No. 162,967
Claims priority, application Netherlands, Sept. 8, 1960, 255,705
6 Claims. (Cl. 71—2.7)

This invention relates to a method for preparing a stable herbicidal composition and to the herbicidal composition prepared.

More specifically, the invention relates to a process for the stabilization of thioncarbomethoxy disulfide, to a process for the production of a stable herbicidal composition containing thioncarbomethoxy disulfide, and to the stabilized composition.

It is known that thioncarboalkoxy disulfides have herbicidal properties.

In the United States Patents 2,615,802 and 2,615,804 a group of compounds is described with the general formula $$\text{R-O-C-S}_x\text{-C-O-R}$$
$$\underset{\text{S}}{\|} \quad \underset{\text{S}}{\|}$$

in which $x$ represents an integer with a value of 2–5 and R represents an alkyl group or a substituted alkyl group. These compounds are suitable for use as herbicides. As the most important compounds, thioncarboethoxy disulfide (T.C.E.D.) and thioncarboisopropoxy disulfide (T.C.I.D.) are mentioned. Thioncarbomethoxy disulfide (T.C.M.D.) is also mentioned.

Now it has been found in experiments that thioncarbomethoxy disulfide having the formula $$\text{H}_3\text{C-O-C-S-S-C-O-CH}_3$$
$$\underset{\text{S}}{\|} \quad \underset{\text{S}}{\|}$$

shows a much stronger herbicidal action than the two other above-mentioned compounds. Thus in a glasshouse test with garden-cress the following LD$_{50}$ values were found:

| | Parts per million (p.p.m.) |
|---|---|
| T.C.E.D. | 1500 |
| T.C.I.D. | 1800 |
| T.C.M.D. | 1200 |

However, when thioncarbomethoxy disulfide was prepared on a commercial scale, the product was found not to be stable. The content of active compound in the technical product decreased by a few percent a month.

For large-scale use the herbicidal technical products are generally incorporated in a hydrocarbon or a hydrocarbon oil together with an emulsifier. However, when such a composition was produced incorporating thioncarbomethoxy disulfide as the active herbicidal ingredient, the active compound also appeared to be unstable and to decompose fairly spontaneously with evolution of heat, formation of gas, separation of sulfur, and change of color from yellow to dark brown. The decomposition is believed to proceed as follows:

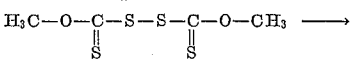

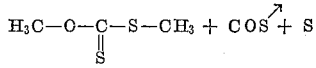

The methyl ester of methylxanthogenic acid thus formed by the decomposition, however, has substantially no herbicidal action.

In view of the instability of the compound, the use of thioncarbomethoxy disulfide as a herbicide was thus not possible in practice.

It is therefore an object of my invention to provide a method for stabilizing thioncarbomethoxy disulfide.

It is a further object to provide a method for producing a stable herbicidal compositon by adding a quantity of acetic acid to thioncarbomethoxy disulfide.

Another object of my invention is to provide a stable herbicidal composition comprising thioncarbomethoxy disulfide and a small quantity of acetic acid.

Still another object of my invention is to provide a method for combatting weeds by applying a stabilized thioncarbomethoxy disulfide.

These and other objects of my invention will become apparent as the description proceeds.

I have now found that the above objects can be achieved by the use of my invention. I have found that thioncarbomethoxy disulfide can be stabilized by addition of an alkanoic acid having from 2 to 4 carbon atoms in a quantity not exceeding 5 percent, generally 0.1–2 percent, based on the thioncarbomethoxy disulfide. Such acids include acetic, propanoic and butyric acids. In this way the commercial product can be kept for a considerable time without the content of active compound appreciably decreasing.

Furthermore I have found that a herbicidal composition containing thioncarbomethoxy disulfide can be produced without the content of active compound in the product decreasing if an alkanoic acid with from 2 to 4 carbon atoms is incorporated in the composition in a quantity not exceeding 5 percent by weight, based on the thioncarbomethoxy disulfide. In general a quantity of 0.1–2 percent by weight of alkanoic acid, based on the active compound, will suffice.

By way of example the preparation of the thioncarbomethoxy disulfide may be carried as follows:

EXAMPLE I

In a vessel provided with a stirrer, a dropping funnel, a reflux condensor and a gas inlet tube 12 kg. of 100% methanol are introduced, to which 26.2 kg. of carbon disulfide are added. Subsequently 35 kg. of 40% sodium hydroxide solution are added, the temperature being manitained at 15–20° C. After addition of all sodium hydroxide solution stirring is continued during 18 hours, whereafter a clear solution is obtained. The yield of this condensation is 92–93% according to the CS$_2$— determination of Clarke.

In the resulting solution 13 kg. of chlorine gas are fed in 7 hours at a temperature of 15–20° C., until the pH value of the reaction mixture is about 7.

The reaction product consists of an aqueous layer and an oily layer. Both layers are separated and the oily layer is washed until it is free from acid, whereafter it is stirred with calcium chloride in order to remove the water present. 32.2 kg. of a transparent clear oil are obtained. Yield 90.2%.

The table below lists the results of a number of stabilization tests. These tests were carried out with emulsifiable solutions of thioncarbomethoxy disulfide, thioncarboethoxy disulfide, and thioncarboisopropoxy disulfide. The solvent used was a product consisting mainly of xylenes, to which a mixture of alkyl aryl sulfonate and the ester of polyethylene glycol ether was added as emulsifier. The pH of the emulsion was determined both before and after the stabilization test.

*Table I*

| Test No. | Active Compound Based On | Stabilizer 0.5%, solution | Temp., °C. | pH | Content, percent by weight | Content after [14 days | Percent by weight after 1 month | pH after 14 days |
|---|---|---|---|---|---|---|---|---|
| 1 | T.C.M.D. | None | 20 | 3.5 | 35.5 | 18.4 | | 6.1 |
| 2 | T.C.M.D. | do | 60 | 3.5 | 35.5 | 13.4 | | 6.2 |
| 3 | T.C.M.D. | Acetic acid 90% | 20 | 3.1 | 35.5 | 35.2 | 35.2 | 3.1 |
| 4 | T.C.M.D. | do | 60 | 3.1 | 35.5 | 35.5 | 35.5 | 3.1 |
| 5 | T.C.M.D. | Dichloroacetic acid | 60 | 3.2 | 36.8 | | 25.8 | 6.0 |
| 6 | T.C.M.D. | Formic acid | 60 | 3.2 | 36.6 | | 17.8 | 5.7 |
| 7 | T.C.M.D. | Pyridine | 20 | 6.0 | 36.6 | After 1 day 15.7 | | 6.5 |
| 8 | T.C.M.D. | do | 60 | 6.0 | 36.6 | After 1 hr. 26.9. | | 6.5 |
| 9 | T.C.E.D. | None | 20 | 3.5 | 36.6 | | 36.5 | 3.5 |
| 10 | T.C.E.D. | None | 60 | 3.5 | 36.6 | | 36.5 | 3.5 |
| 11 | T.C.I.D. | None | 20 | 3.5 | 36.6 | | 36.4 | 3.5 |
| 12 | T.C.I.D. | None | 60 | 3.5 | 36.6 | | 36.4 | 3.5 |

The table given below lists the results of a second series of stabilization tests. These tests were carried out at a temperature of 60° C. with emulsifiable solutions of thioncarbomethoxy disulfide. The content of active compound in the solution was initially 36.8% by weight. The solutions were stabilized with 0.5% by weight of carboxylic acid. As a solvent a product was used consisting mainly of xylenes to which a mixture of alkylarylsulfonate and the ester of polyethylene glycol ether was added as an emulsifier.

*Table II*

| Carboxylic acid | Content of thioncarbomethoxy disulfide | |
|---|---|---|
| | After 7 days | After 14 days |
| $CH_3COOH$, 90% | 35.7 | 34.4 |
| $CH_3COOH$, 100% | 35.9 | 34.4 |
| $C_2H_5COOH$ | 35.4 | 34.0 |
| $C_3H_7COOH$ | 35.0 | 33.5 |
| iso $C_4H_9COOH$ | 33.3 | 22.1 |
| $C_5H_{11}COOH$ | 29.5 | 18.2 |

From this table it appears clearly which sharp difference there is between the carboxylic acids having 4 and having 5 carbon atoms with respect to their stabilizing action, expressed as the content of thioncarbomethoxydisulfide in the solution after storage during more than one week.

From the data of the above tables it is evident that thioncarboethoxy disulfide and thioncarboisopropoxy disulfide are quite stable without addition of a stabilizer, but that thioncarbomethoxy disulfide without a stabilizer tends to decompose rapidly. Furthermore the effect of the use of acetic, propanoic or butyric acids as compared with the other acids employed is very striking. It is also apparent that in a properly stabilized composition the pH of the emulsion does not change. Finally it appears from Table I that the thioncarbomethoxy disulfide decomposes rapidly in an alkaline medium, obtained by the addition, for instance, of traces of amines.

The amount of thioncarbomethoxy disulfide used in the emulsion may range from 10 to 70 percent by weight.

The compositions produced according to the invention are eminently suitable to be used as contact-herbicidal compositions which can be employed until very shortly before the crops are up. The combatting of weeds before the crops are up is becoming more and more general in agriculture and horticulture, because in this way the herbicide does not come into contact with the crops themselves. In addition, the weeds are still small and can be killed more easily. Since only those types of weed which have come up are killed (contact action), the products used for this purpose are suitable primarily for slowly germinating crops.

With rapidly germinating crops the use of such a product is mainly where sufficient weeds are present, but usually a combination with some other product, such as isopropyl N-(3-chlorophenyl)-carbamate, is sufficient.

In contrast with known products which can be used before the crops are up, such as pentachlorophenol, which has to be used at least 5 days before the crops are up, thioncarbomethoxy disulfide can be employed until half a day before the crops are up.

A further advantage of thioncarbomethoxy disulfide is that its use is not as harmful. If heavy rains occur a few hours after the use of the compound according to the invention, no harm is done to the crops owing to the penetration of the active compound into the soil, whereas this does happen if pentachlorophenol is used.

While I have set forth specific embodiments and preferred modes of practice of my invention, for the purpose of illustration and to enable persons skilled in the art to better understand and practice the invention, it will be understood that the invention is not limited thereby and that various changes and modifications may be made in the invention without departing from the spirit of the disclosure or the scope of the appended claims.

This application is a continuation-in-part of my co-pending application Serial No. 80,754, filed January 5, 1960, now abandoned.

I claim:

1. A stable herbicidal composition comprising thioncarbomethoxy disulfide as the active ingredient in an amount sufficient to achieve a herbicidal effect and at least one acid selected from the group consisting of acetic acid, propionic acid, isobutyric acid and butyric acid, as a stabilizer in an amount from about 0.1 to about 5% by weight of carboxylic acid based on the active ingredient.

2. The composition of claim 1, wherein the amount of carboxylic acid incorporated is 0.1–2% by weight, based on the thioncarbomethoxy disulfide.

3. A stable herbicidal composition comprising thioncarbomethoxy disulfide as the active ingredient in an amount sufficient to achieve a herbicidal effect and at least one acid selected from the group consisting of acetic acid, propionic acid, isobutyric acid and butyric acid, as a stabilizer in an amount from about 0.1 to about 5% by weight of carboxylic acid, based on the active ingredient, a hydrocarbon carrier and an emulsifier.

4. A stable herbidical composition comprising thioncarbomethoxy disulfide as the active ingredient in an amount sufficient to achieve a herbicidal effect and at least one acid selected from the group consisting of acetic acid, propionic acid, isobutyric acid and butyric acid, as a stabilizer in an amount from about 0.1 to about 5% by weight of carboxylic acid, based on the active ingredient, a hydrocarbon carrier and an emulsifier, wherein the amount of active ingredient is from about 10 to about 70% by weight.

5. A stable herbicidal composition comprising thioncarbomethoxy disulfide as the active ingredient in an amount sufficient to achieve a herbicidal effect and at least one acid selected from the group consisting of acetic acid, propionic acid, isobutyric acid and butyric acid, as a stabilizer in an amount from about 0.1 to about 5% by weight of carboxylic acid, based on the active ingredient, a hydrocarbon carrier comprising xylenes and an emulsifier comprising a mixture of alkyl aryl sulfonate and the ester of polyethylene glycol ether, wherein the amount of active ingredient is from about 10 to about 70% by weight.

6. A method for combatting weeds which comprises applying to said weeds a stabilized herbicidal composition comprising thioncarbomethoxy disulfide as the active ingredient in an amount sufficient to achieve a herbicidal effect and having as a stabilizer a quantity of at least one of the acids selected from the group consisting of acetic acid, propionic acid, isobutyric acid and butyric acid, from about 0.1 to about 5% by weight of carboxylic acid, based on the weight of the active ingredient, added as a stabilizer.

References Cited in the file of this patent

UNITED STATES PATENTS

| | | |
|---|---|---|
| 2,120,285 | MacAfee | June 14, 1938 |
| 2,600,861 | Englund | June 17, 1952 |
| 2,615,802 | Bruner | Oct. 28, 1952 |
| 2,615,804 | Stewart et al. | Oct. 28, 1952 |
| 2,813,890 | Cyphers et al. | Nov. 19, 1957 |